Sept. 26, 1939.  H. A. CURTIS ET AL  2,173,825
APPARATUS FOR MAKING CALCIUM METAPHOSPHATE
Filed July 23, 1936
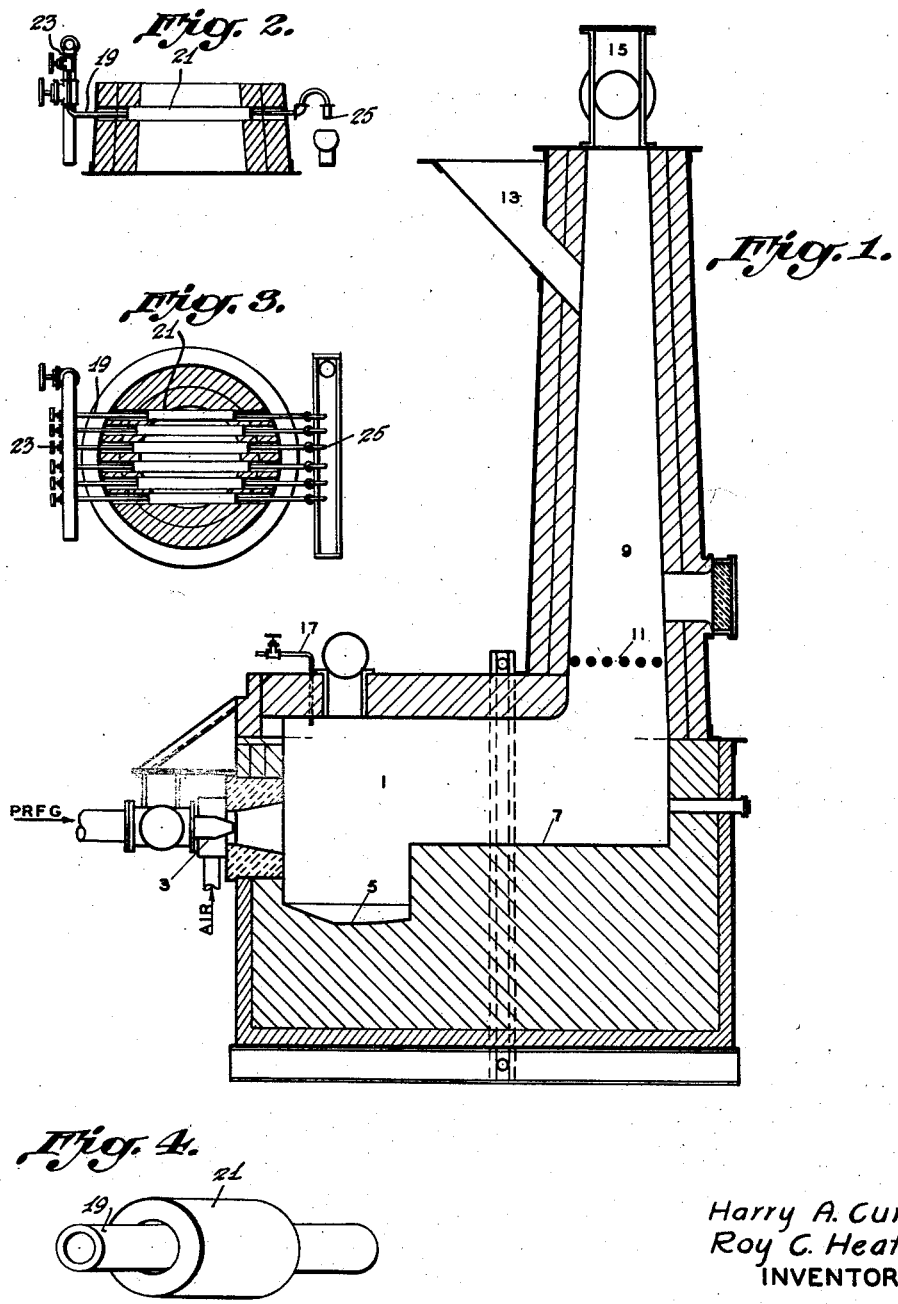
Harry A. Curtis
Roy C. Heaton
INVENTORS
BY Arthur P. Davis
ATTORNEY Patented Sept. 26, 1939

2,173,825

UNITED STATES PATENT OFFICE 2,173,825

APPARATUS FOR MAKING CALCIUM METAPHOSPHATE

Harry A. Curtis, Knoxville, Tenn., and Roy C. Heaton, near Sheffield, Ala.

Application July 23, 1936, Serial No. 92,208

2 Claims. (Cl. 23—277)

(Granted under the act of March 3, 1883, as amended April 30, 1928; 370 O. G. 757)

This application is made under the act of April 30, 1928 and the invention herein described, if patented, may be manufactured and used by or for the Government for governmental purposes without the payment to us of any royalty thereon.

This invention relates to an apparatus for making calcium metaphosphate.

One of the objects of this invention is to provide an apparatus for the production of a fused product from a very high temperature gaseous medium containing at least one active reactant and from another reactant which fuses at a temperature considerably above the fusing point of the product formed. Another object of this invention is to provide a suitable support for a high melting point solid reactant from which is formed a lower melting point product so that the latter may be removed continuously from the solid reactant. Other objects of this invention include the combination in one apparatus of a means of volatilizing and oxidizing elemental phosphorus and reacting the phosphorus pentoxide so formed.

Elemental phosphorus or phosphate reduction furnace gas containing the same may be oxidized to form phosphorus pentoxide which may, in turn, be reacted with phosphate rock or other calcium containing material reactive with phosphorus pentoxide to form calcium metaphosphate. The hot gaseous mixture containing the phosphorus pentoxide is preferably contacted with the calcium containing material, such as phosphate rock, in a shaft furnace. Pure calcium metaphosphate fuses at approximately 975° C. Since it is desirable to separate the fused calcium metaphosphate from the phosphate rock which has a fusion point of approximately 1500° C., it is desirable to carry out the reaction at temperatures of the order of 1000° C. to 1300° C. The problem of supplying the shaft furnace with a suitable grate which could support the column of phosphate rock, and, at the same time, permit continuous withdrawal of the crude fused calcium metaphosphate formed, presented itself. Known constructions, several of which were used, were found unsuitable for this purpose.

We have discovered a novel combination of apparatus suitable for accomplishing the objects of this invention which comprises a horizontal refractory lined combustion chamber equipped with a means for admitting elemental phosphorus or phosphate reduction furnace gas and at least sufficient air to oxidize all of the phosphorus admitted, a hearth in the bottom of the chamber in the end of the chamber adjacent to the points of admission of the phosphorus and air, a tap-hole in the wall of the chamber at the elevation of the hearth for withdrawing the fused calcium metaphosphate, a second hearth adjacent to the end of the chamber opposite the points of admission of the phosphorus and air with an elevation substantially above that of the first hearth; and a vertical refractory lined shaft on top of and opening into the combustion chamber at the end opposite the points of admission of the phosphorus and air and above the elevated hearth equipped with an internally water cooled, horizontal grate of parallel metal tubes each covered at least in the zone between the refractory lined walls of the shaft with a refractory sleeve, an inlet in the top of the shaft for charging phosphate rock, and an outlet at the top of the shaft for residual gaseous combustion products.

In the accompanying drawing, which forms a part of the specification, and wherein reference symbols refer to like parts whenever they occur.

Fig. 1 is a diagrammatic, vertical, sectional view of one form of apparatus for the embodiment of our invention, Fig. 2 is a vertical, sectional view of the internally water cooled horizontal grate of parallel metal tubes each covered at least in the zone between the refractory lined walls and the shaft furnace with a refractory sleeve and located in the base of the shaft shown in Fig. 1, Fig. 3 is a plan view of the internally water cooled horizontal grate shown in Fig. 2, Fig. 4 is a diagrammatic view of a section of one of the internally water cooled horizontal grates shown in Fig. 2 and Fig. 3.

In Fig. 1, phosphate reduction furnace gas and air are admitted into the horizontal refractory lined combustion chamber 1, through the burner 3. The hearth 5, is in the bottom of chamber 1, at the end adjacent to the burner 3, while the hearth 7, is adjacent to the end of the chamber 1, opposite the burner 3, with an elevation substantially above that of the hearth 5. The vertical refractory lined shaft 9, is on top of and opens into chamber 1, at the end opposite the burner 3, and above the elevated hearth 7. The bottom of the shaft 9, is fitted with an internally water cooled horizontal grate 11, made up of parallel metal tubes each covered in the zone between the refractory lined walls of the shaft with a refractory sleeve to support the charge in the shaft 9. The top of the shaft 9, is fitted with an inlet 13, for charging phosphate rock or other calcium containing material and an outlet 15, for the residual gaseous combustion product. When elemental phosphorus is used in place of phosphate reduction furnace gas, the phosphorus is admitted into the chamber 1, through the line 17, so placed that the elemental phosphorus so admitted drops onto the fused metaphosphate on hearth 5, from which it is volatilized and subsequently oxidized.

In Fig. 2, the construction of a single element of the grate 11, is illustrated by the metal tube 19, covered by a refractory sleeve 21, with the valved water supply 23, and the outlet 25, for the metal tube 19.

In Fig. 3, the grate 11, is shown in plan view with a representative metal tube 19, refractory sleeve 21, valved water supply 23, and outlet 25.

In Fig. 4, the metal tube 19, of grate 11, is shown partially covered with the refractory sleeve 21.

One example of the operation of our apparatus is given for making calcuim metaphosphate from phosphate reduction furnace gas and phosphate rock. Lump phosphate rock is charged onto the internally water cooled horizontal grate of parallel metal tubes each covered at least in the zone between the refractory lined walls of the shaft with a refractory sleeve. Phosphate reduction furnace gas and at least a sufficient quantity of air to oxidize all of the phosphorus to phosphorus pentoxide are admitted through a burner into the combustion chamber at the end opposite the shaft. The phosphate rock in the bottom of the shaft is heated to a temperature such that it reacts readily with phosphorus pentoxide to form calcium metaphosphate. In order, however, for the calcium metaphosphate so formed to be separated readily from the rock, the temperature in the bottom of the shaft above the grate is maintained somewhat above the temperature of fusion of the crude calcium metaphosphate formed, such as 1150° C. to 1200° C. Consequently, the fused calcium metaphosphate formed drops through the grate onto the elevated hearth below the grate. The temperature of the grate is so controlled by the passage of water through the individual metal tubes covered by their respective refractory sleeves as to permit the gradual withdrawal of the fused calcium metaphosphate through the grate and, at the same time, to maintain the tubes at a sufficiently low temperature so that the grate made up by them is of sufficient strength to support the burden above it. The fused calcium metaphosphate flows from the elevated hearth countercurrent to the hot gaseous combustion products carrying the phosphorus pentoxide onto the lower hearth from which it is withdrawn continuously or periodically.

Another example of the operation of our apparatus is given for making calcium metaphosphate from elemental phosphorus and phosphate rock. The operation of the apparatus is substantially identical to that given in the preceding example except that insofar as the provision for admitting elemental phosphorus is concerned. The elemental phosphorus is admitted through the top of the combustion chamber above the lower hearth so that the elemental phosphorus falls on the surface of the fused calcium metaphosphate on this hearth and is almost immediately volatilized. The phosphorus so volatilized is immediately oxidized by air admitted through the end of the combustion chamber.

It is evident that there are numerous factors which will influence conditions for the most satisfactory operation of our invention, the actual limits of which cannot be established except by a detailed study of each set of raw materials and the intermediate and finished products involved.

The combustion chamber is provided with two hearths. The lower hearth, which is adjacent to the burner or other point of admission of elemental phosphorus and air, serves to receive the fused calcium metaphosphate from which it is finally withdrawn from the chamber. The second hearth, which is elevated substantially above the first hearth and at the other end of the combustion chamber, may be constructed in any suitable shape so that the fused product falling through the grate will slowly and positively move from the elevated hearth to the lower hearth. The shape of the elevated hearth may be either a plane or curved surface but, in any event, no point on the hearth should be lower than the edge adjacent to the burner.

The grate in the bottom of the shaft is preferably constructed of a combination of individual refractory covered metal tubes arranged in parallel. Each tube extends beyond the outside of the refractory lined shaft and is covered at least for the zone between the refractory lined walls of the shaft with a refractory sleeve. The refractory sleeve may be one or a plurality of suitably shaped refractory elements made of refractory material, such as graphite, carborundum, and the like. Each metal tube is connected to a valved water supply line on one end and a trapped water outlet on the other end.

It will be seen, therefore, that this invention actually may be carried out by the modification of certain details without departing from its spirit or scope.

We claim:

1. In an apparatus for making a fused product from a solid reactant and a substantially gaseous reactant mixture, derived by the oxidation of a gaseous reactant or reactant mixture and a gaseous reactant, wherein the fused product has a melting point lower than the solid reactant, the combination which comprises a horizontal refractory lined combustion chamber, means for admitting the reactants from which the substantially gaseous reactant mixture is derived into a zone in one end of said chamber, a hearth forming the bottom of said zone, means for withdrawing the fused product from said hearth, a second hearth forming the bottom of a zone in the other end of said chamber having an elevation substantially above that of the first mentioned hearth and adapted to permit a flow of used material from the former to the latter, a vertical refractory lined shaft adapted to discharge material from the bottom thereof into said chamber and onto said second hearth, means for charging the solid reactant into the top of said shaft, an internally fluid cooled grate in and near the bottom of said shaft consisting of parallel metal tubes each covered with refractory and adapted to support a column of said solid reactant and to permit fluid material produced in said shaft to discharge from said grate, and means for withdrawing the residual gaseous reactant mixture from near the top of said shaft.

2. In an apparatus for making a fused product from a solid reactant and a substantially gaseous reactant mixture derived by the oxidation of a solid or liquid reactant and a gaseous reactant, wherein the fused product has a melting point lower than the solid reactant, the combination which comprises a horizontal refractory lined combustion chamber, means for admitting the reactants from which the substantially gaseous reactant mixture is derived into a zone in one end of said chamber, a hearth forming the bottom of said zone, means for withdrawing the fused product from said hearth, a second hearth forming the bottom of a zone in the other end of said chamber having an elevation substantially above that of the first mentioned hearth and adapted to permit a flow of fused material from the former to the latter, a vertical refractory lined shaft adapted to discharge material from the bottom thereof into said chamber and onto said second hearth, means for charging the solid reactant into the top of said shaft, an internally cooled grate in and near the bottom of said shaft adapted to support a column of said solid reactant in said shaft and to permit fluid material produced in said shaft to discharge through said grate, and means for withdrawing the residual gaseous reactant mixture from near the top of said shaft.

HARRY A. CURTIS.
ROY C. HEATON.

CERTIFICATE OF CORRECTION.

Patent No. 2,173,825. September 26, 1939.

HARRY A. CURTIS, ET AL.

It is hereby certified that error appears in the printed specification of the above numbered patent requiring correction as follows: Page 2, second column, line 59, claim 1, for the word "used" read fused; and that the said Letters Patent should be read with this correction therein that the same may conform to the record of the case in the Patent Office.

Signed and sealed this 31st day of October, A. D. 1939.

(Seal)

Henry Van Arsdale,
Acting Commissioner of Patents.